(12) United States Patent
Weigel et al.

(10) Patent No.: US 6,521,169 B1
(45) Date of Patent: Feb. 18, 2003

(54) PROCESS FOR THE PRODUCTION OF CELLULOSE SHAPED BODIES, BODIES PRODUCED BY THIS PROCESS AND THE USE THEREOF

(75) Inventors: Peter Weigel, Kleinmachnow (DE); Hans-Peter Fink, Teltow (DE); Konrad Frigge, Potsdam (DE)

(73) Assignee: Fraunhofer-Gesellschaft zur Forderung der Angewandten Forschung e.V., Munich (DE)

( * ) Notice: Subject to any disclaimer, the term of this patent is extended or adjusted under 35 U.S.C. 154(b) by 0 days.

(21) Appl. No.: 09/242,273

(22) PCT Filed: Jul. 15, 1997

(86) PCT No.: PCT/DE97/01527

§ 371 (c)(1), (2), (4) Date: Aug. 6, 1999

(87) PCT Pub. No.: WO98/07781

PCT Pub. Date: Feb. 26, 1998

(30) Foreign Application Priority Data

Aug. 19, 1996 (DE) .......................................... 196 33 405

(51) Int. Cl.[7] .............................. B29C 47/00; C08L 1/02
(52) U.S. Cl. ....................... 264/561; 264/565; 264/569; 264/187; 264/203
(58) Field of Search ........................ 428/34.8; 264/560, 264/561, 565, 569, 187, 203, 207

(56) References Cited

U.S. PATENT DOCUMENTS

| | | | | |
|---|---|---|---|---|
| 5,290,830 A | * | 3/1994 | Tung et al. | 524/35 |
| 5,603,884 A | * | 2/1997 | DuCharme, Jr. et al. | 264/203 |
| 5,653,931 A | * | 8/1997 | Eibl et al. | 264/187 |
| 5,744,251 A | * | 4/1998 | DuCharme, Jr. et al. | 428/536 |
| 5,747,125 A | * | 5/1998 | Markulin | 428/34.8 |
| 5,804,120 A | * | 9/1998 | Boerstoel et al. | 264/187 |
| 5,928,739 A | * | 7/1999 | Pophusen et al. | 428/34.8 |
| 5,932,158 A | * | 8/1999 | Boerstoel et al. | 264/176.1 |

FOREIGN PATENT DOCUMENTS

EP  0 712 889 A2  *  5/1996

OTHER PUBLICATIONS

Swelling and Dissolution of Cellulose in Amine Oxide/Water Systems, H. Chanzy, P. Noe, M. Paillet, and P. Smith, Journal of Applied Polymer Science: Applied Polymer Symposium 37, pp. 239–259, 1983.

* cited by examiner

Primary Examiner—Mark Eashoo
(74) Attorney, Agent, or Firm—Barnes & Thornburg

(57) ABSTRACT

Process for the production of cellulose shaped bodies through the precipitation of a cellulose solution containing cellulose dissolved in an amine oxide/water system in a precipitation bath, wherein the solution contains additional cellulose fibers.

8 Claims, 1 Drawing Sheet

Figure 1:
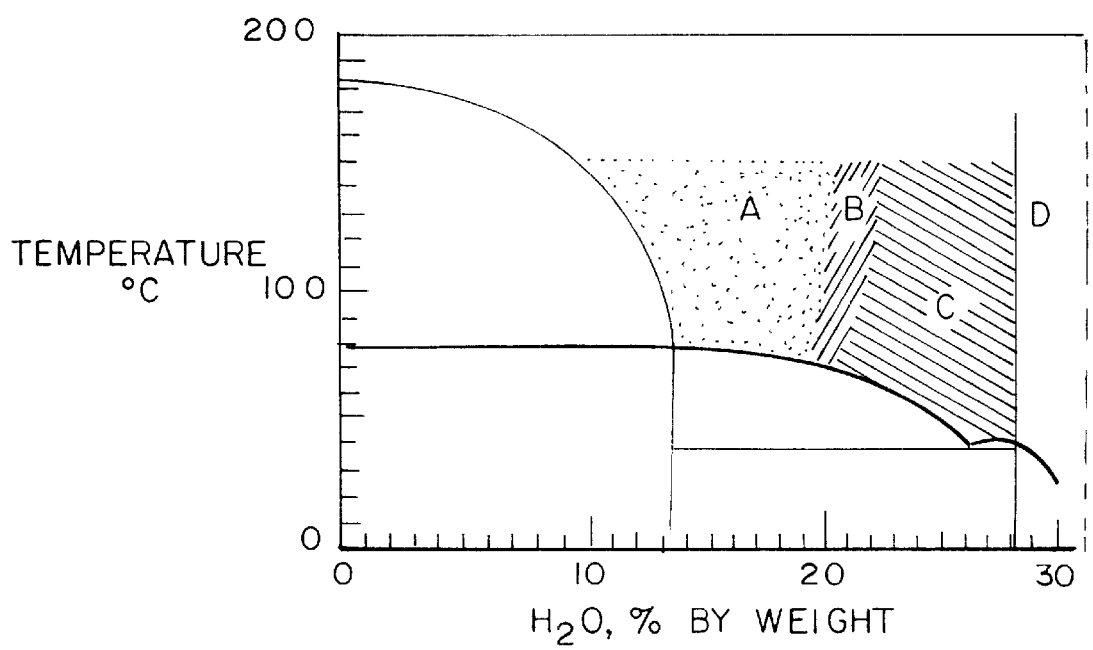

PROCESS FOR THE PRODUCTION OF CELLULOSE SHAPED BODIES, BODIES PRODUCED BY THIS PROCESS AND THE USE THEREOF

CROSS-REFERENCES TO RELATED APPLICATIONS

This application is a U.S. national application of international application serial No. PCT/DE97/01527 filed Jul. 15, 1997, which claims priority to German Serial No. 196 33 405.5 filed Aug. 19, 1996.

The invention relates to cellulose mouldings which are produced by extruding a solution of cellulose in amine oxides and are reinforced by cellulose fibres, and to a process for their production, and also to their use.

Cellulose mouldings made from recycled cellulose material are predominantly produced by the known viscose process. Due to the high environmental pollution associated with this process, and the considerable capital expenditure, considerable efforts are currently being made worldwide to replace the viscose process with alternative processes. A promising process in relation to the production of cellulose fibres is the spinning of solutions of the cellulose in amine oxides. It is, known from DE 28 30 685 and also from DD 218 121 that cellulose is soluble in an N-methylmorpholine-N-oxide (NMMNO)/water system, and can be processed by spinning into a precipitation bath composed mostly of aqueous NMMNO solution, to give textile fibres. Products produced by this process are already on the market.

Processes for producing nonfibrous cellulose mouldings from NMMNO solutions, in particular films as packaging of food or drink and also specifically in the form of blown films as sausage casings, are likewise known. In EP 0 662 283 and WO 95/07811 the blown film is taken off via a mandrel and/or via an apparatus composed of a number of discs located in the area of the air gap between annular die and precipitation bath. In the process described in DE 44 21 482 the film bubble emerging from the annular die is stabilized and expanded by the pressure of the column of liquid present in its interior and of the column of air thereabove. This process is therefore very similar to the known blown-film process, which is used in particular in producing films from thermoplastics.

The material properties of mouldings made from a polymeric material are frequently improved by producing a composite which is composed of a polymeric matrix and a fibre material. Cellulose films, specifically sausage casings, are frequently reinforced with paper or a nonwoven or woven fabric (DE 23 38 418). This hinders, inter alia, easy propagation of existing fractures, and substantially balances out any strength differences longitudinally and transversely to the direction in which the machine is running. However, the production of composites of this type is relatively complicated, in particular when the amine oxide process is used.

Starting from this point, the object of the present invention is to provide a process which can produce cellulose mouldings with improved strength properties and which, in particular, also has a favourable effect on the properties of cellulose films.

The object is achieved in relation to the process by the characterizing features of Claim 1, and in regard to the mouldings themselves by the characterizing features of Claim 9. Advantageous embodiments are given in the subclaims. The use of the cellulose films produced according to the invention is characterized in Patent Claim 11.

The novel process features a precipitating solution, a cellulose dissolved in an amine oxide/water system, which additionally comprises cellulose fibres, preferably short fibres. Extrusion/precipitation of this mixture produces a fibre-reinforced composite material. This composite made from highly oriented cellulose fibres in a monoaxially or biaxially oriented cellulose matrix features increased strength and controllable anisotropic mechanical properties.

In composites in which fibres have been embedded into a polymer matrix, there is frequently the problem that the adhesive forces between the fibre and matrix are very low and therefore the desired strength is not achieved. The required adhesion between fibre and matrix is frequently only achieved by using coupling agents, and this is associated with additional cost in the production process. This, problem does now not arise in the novel process, since the fibres in the cellulose solution become slightly dissolved and/or swollen at the surface, and are therefore embedded firmly into the cellulose matrix during coagulation. It has proven useful here for the proportion of the fibres in the total content of the cellulose to be at least 5% and at most 90%, preferably from 20 to 60%. The cellulose solution comprising cellulose fibres may be obtained by introducing additional fibres into the cellulose solution or else by incomplete dissolution of the cellulose during preparation of the cellulose fibres.

Complete dissolution of the fibers introduced can be prevented by reducing the capability of the NMMNO/water/cellulose system to dissolve more cellulose. It can be seen from the phase diagram in FIG. 1 that this capability can be reduced by lowering the temperature and/or increasing the proportion of water in the solution. According to the invention, this can also control the degree of swelling and/or of surface dissolution of the fibers introduced into the solution. This gives another way of varying the properties of the moldings. These advantages do not exist in the viscose process, since here the non-derivatized cellulose is not dissolved. In FIG. 1, area A illustrates complete solution of the cellulose fibers. Area B illustrates irreversible swelling of the cellulose fibers. Area C illustrates reversible swelling of the cellulose fibers. Area D illustrates no alteration of the cellulose fibers.

The novel process can be used either as a casting process or else in extrusion.

The process is in particular also suitable for producing blown films and flat films.

Practically all types of short cellulose fibre may be used for the cellulose/cellulose fibre composite, for example chemical pulps, recycled fibre materials or natural fibres, e.g. cotton linters, flax, hemp, bast, jute, sisal, ramie or manila. It is, of course, particularly advantageous here to use high-strength fibres. Depending on the fibre thickness, the fibre length is preferably in the range from a few $\mu$m to a number of mm. It is particularly favourable to use fibres with a very low titre, firstly due to the large specific surface area of the fibre and secondly because in film production the fibre diameter is directly related to the minimum achievable film thickness. According to the invention, therefore, the exceptionally thin and high-strength fibres of bacterial cellulose are particularly well suited for fibre-reinforcement of the cellulose mouldings, specifically of the films.

The novel process is particularly suitable for producing blown films using a film-blowing process. For this, a blown film is produced by extrusion through an annular die. A process of this type is described in the abovementioned DE 44 21 482. These disclosures are expressly incorporated herein by reference.

The mouldings produced by this process have an excellent modulus of elasticity from 1200 to 15,000 MPa. These films are particularly suitable for packaging food or drink. The moduli of elasticity of the mouldings depend on the process and for those produced by the casting process are in the lower range, preferably from 1200 to 6000 MPa, and are in the range from 5000 to 10,000 MPa for mouldings produced by extrusion processes.

The invention is described in more detail below using working examples.

EXAMPLE 1

1st Comparative Example

Water is added to a solution of 9% of cellulose in NMMNO monohydrate (ratio NMMNO/water=87/13) until the NMMNO/water ratio is 82/18. The solution is processed to give a cast film, by spreading out on a glass plate followed by coagulation in water. After drying the film has a modulus of 810 MPa.

EXAMPLE 2

As Example 1 with addition of 30% of ground cellulose, based on the dissolved cellulose, to the cellulose solution. After drying, the film has a modulus of 1240 MPa.

EXAMPLE 3

As Example 2 with addition of flax instead of cellulose to the cellulose solution. After drying, the film has a modulus of 2350 MPa.

EXAMPLE 4

As Example 2 with addition of bacterial cellulose instead of cellulose to the cellulose solution. After drying, the film has a modulus of 1620 MPa.

EXAMPLE 5

As Example 3 with reduction of the water content of the solution to an NMMNO/water ratio of 85/15. After drying, the film has a modulus of 2100 MPa.

EXAMPLE 6

2nd Comparative Example

A solution corresponding to Example 1 is extruded through an annular die via an air gap into an aqueous precipitation bath. After drying, the blown film has a modulus of 1900 MPa.

EXAMPLE 7

As Example 6 with addition of 30% of ground cellulose, based on the dissolved cellulose, to the cellulose solution. After drying, the film has a modulus of 5400 MPa.

What is claimed is:

1. A process for producing blown films comprising the steps of forming a cellulose and aqueous amine oxide solution, introducing additional fibers into the solution, and producing a blown-film by extrusion through an annular die wherein the degree of swelling of the additional fibers is controlled by lowering the temperature and/or increasing the proportion of water in the solution.

2. The process according to claim 1 wherein the proportion of the fibers in the total content of the cellulose in the solution is at least 5% and at most 90%.

3. The process according to claim 2 wherein the fibers introduced into the cellulose solution are selected from the group consisting of chemical pulp, recycled fiber material and natural fibers.

4. The process according to claim 1 wherein the proportion of the fibers relative to the total cellulose content is at least 20% and at most 60%.

5. The process according to claim 1 wherein the fibers introduced into the cellulose solution are selected from the group consisting of chemical pulp, recycled fiber material and natural fibers.

6. The process according to claim 1 wherein the fibers are bacterial cellulose fibers.

7. The process according to claim 6 wherein the proportion of the fibers in the total content of the cellulose in the solution is at least 5% and at most 90%.

8. The process according to claim 6 wherein the proportion of the fibers relative to the total cellulose content is at least 20% and at most 60%.

* * * * *